Aug. 6, 1940. W. EGERLAND 2,210,029

VARIABLE CONDENSER

Original Filed Feb. 25, 1936

INVENTOR
WOLFGANG EGERLAND
BY
ATTORNEY

Patented Aug. 6, 1940

2,210,029

UNITED STATES PATENT OFFICE 2,210,029

VARIABLE CONDENSER

Wolfgang Egerland, Berlin, Germany, assignor to Siemens and Halske, Aktiengesellschaft, Berlin-Siemensstadt, Germany, a corporation of Germany Application February 25, 1936, Serial No. 65,554
Renewed July 15, 1939. In Germany March 9, 1935

15 Claims. (Cl. 175—41.5)

This invention relates to a new and novel variable condenser. The variable condenser of this invention is disclosed by the following specification and shown by the accompanying drawing, in which:

Fig. 3 is a curve of variable condensers as known in the prior art; while

Compression type of variable condensers are known in the prior art in which flat and horizontally disposed intermediate dielectric layers are provided to correspond to the flat and horizontally disposed conductive coats or plates.

Figure 3:
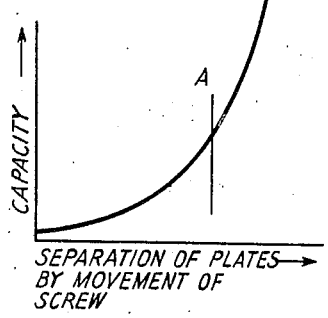

The capacity of condensers of this kind is increased in proportion to the movement of the variable conductive coat or plate as it is changed so as to be at a closer proximity to the fixed conductive coat or plate. However, the capacity value does not rise in direct proportion to the reduction of the distance, in fact, it grows in accordance with a function as approximately illustrated by the curve in Fig. 3.

It will thus be noted from the above mentioned curve that as soon as the capacity has assumed a certain magnitude (point A, Figure 3), the growth becomes very marked with even a slight variation of the distance. Now, such a circuit change involves a number of serious drawbacks, for example, if with a certain previously adjusted capacity, there is brought about a slight alteration of the distance, caused by the shock or percussion of the condenser, the resultant change in capacity will be found to be inadmissibly high. In other words, condensers of this sort can be actually utilized only inside a comparatively small range of regulation.

Now, the present invention discloses a condenser in which the above mentioned drawbacks are obviated. The shape of the capacity rate of change curve is made far more favorable, and as a result the utilizable regulating range of the condenser is increased.

This desired rate of capacity change is obtained by having the dielectric located at the various points where it is in contact with a conductive coat made at least partly angular with reference to the horizontal line. Preferably, the dielectric is constructed so that it presents a cross-section which is step- or wedge-shaped, or is bounded according to a definite predetermined curve. The stationary conductive coat or plate is shaped so as to match the curve of the dielectric.

Figure 4:
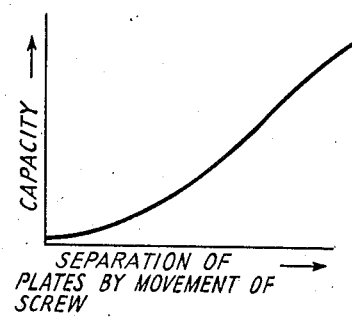
Fig. 4 is a curve of a variable condenser according to this invention.

Especially where recourse is had to a wedge-shaped, or curvilinearly bounded or contoured dielectric, a capacity rate of change graph presenting a fairly continuous and uniform shape as shown in Fig. 4 is obtained. What can be seen from this curve is that the utilizable regulation range of a condenser according to the invention is substantially flattened.

Figure 1:
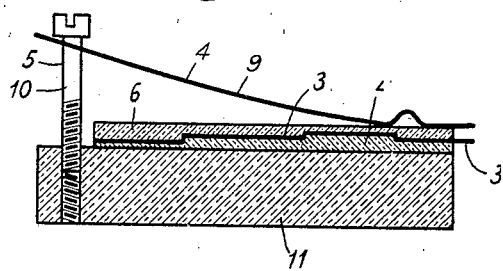
Fig. 1 is a sectional view of a condenser of this invention having a dielectric which has a stepped cross-section.
Figure 2:
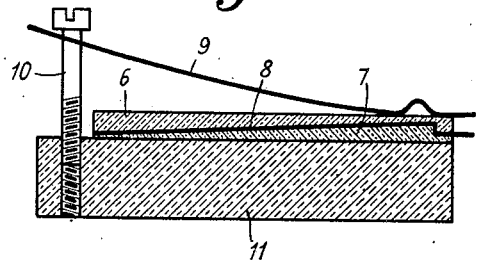
Fig. 2 is a sectional view of a condenser having a wedge-shaped dielectric cross-section.

Figures 1 and 2 illustrate two exemplified embodiments of the invention.

Referring to Fig. 1, 1 denotes the dielectric which presents a stepped or terraced cross-sectional form. Between the dielectric 1 and a filler compound 2, which, for instance, could also consist of the same material as the dielectric, and which is provided in order to obtain rectangular construction elements, there is arranged the fixed coat 3 which is likewise stepped. The movable coat 4 is adjusted by means of a set screw 5, arranged to run in a threaded hole in insulating base 11.

Referring to Fig. 2, 6 denotes the dielectric which has a cone or wedge-shaped cross-section. Between the said dielectric 6 and the filler mass 7 is the fixed coat 8. 9 denotes the non-stationary coat; 10 is the set screw, and 11 the insulating base or mounting plate.

I claim:

1. A variable condenser of the solid dielectric type comprising a flat insulating base, a fixed plate secured to and spaced away from said base, a movable plate spaced away, secured to and hinged at one end of said base, said fixed plate having its plane decrease in its spacing away from said base from a point where said movable plate is hinged and secured to said base, said movable plate having its plane normally increasing in its spacing away from said base after leaving the point where it is hinged and secured thereto, a solid dielectric interposed between said fixed and movable plates, and means for varying the capacity of said condenser by movement of said movable plate.

2. A variable condenser of the solid dielectric type comprising a flat insulating base, a fixed plate secured to and spaced away from said base, a movable plate spaced away, secured to and hinged at one end of said base, said fixed plate having its plane decrease in its spacing away from said base after leaving a point where said movable plate is hinged and secured to said base, said movable plate having its plane normally increasing in its space away from said base after leaving the point where it is hinged and secured thereto, a solid dielectric interposed between said fixed and movable plates, the outside surface of which lies in a plate substantially parallel to the surface of said flat base, and means for varying the capacity of said condenser by movement of said movable plate.

3. A variable condenser of the solid dielectric type comprising a flat insulating base, a fixed plate secured to and spaced away from said base, a movable plate spaced away, secured to and hinged at one end of said base, said fixed plate having its plane forming a wedge-shaped space which decreases in its spacing away from said base from a point where said movable plate is hinged and secured to said base, said movable plate having its plane normally increased in its spacing away from said base after leaving the point where it is hinged and secured thereto, a solid dielectric interposed between said fixed and movable plates, and means for varying the capacity of said condenser by movement of said movable plate.

4. A variable condenser of the solid dielectric type comprising a flat insulating base, a fixed plate secured to and spaced away from said base, a movable plate spaced away, secured to and hinged at one end of said base, said fixed plate having its plane forming a step-like space which decreases in its spacing away from said base after leaving a point where said movable plate is hinged and secured to said base, said movable plate having its plane normally increasing in its spacing away from said base after leaving the point where it is hinged and secured thereto, a solid dielectric interposed between said fixed and movable plates, and means for varying the capacity of said condenser by movement of said movable plate.

5. A variable condenser of the solid dielectric type comprising a flat insulating base, a fixed plate secured to and spaced away from said base, a movable plate spaced away, secured to and hinged at one end of said base, said fixed plate having its plane form a plurality of step-like spaces which decrease in its spacing away from said base after leaving a point where said movable plate is hinged and secured to said base, said movable plate having its plane normally increasing in its spacing away from said base after leaving the point where it is hinged and secured thereto, a solid dielectric interposed between said fixed and movable plates, and means for varying the capacity of said condenser by movement of said movable plate.

6. A variable condenser of the solid dielectric type comprising a flat insulating base, a fixed plate secured to and spaced away from said base, a movable plate spaced away, secured to and hinged at one end of said base, said fixed plate having its plane continuously and uniformly decrease in its spacing away from said base from a point where said movable plate is hinged and secured to said base, said movable plate having its plane normally increasing in its spacing away from said base after leaving the point where it is hinged and secured thereto, a solid dielectric interposed between said fixed and movable plates, and means comprising a thread in said base and a screw cooperating with said movable plate and the thread in said base for varying the capacity of the condenser.

7. A variable condenser of the solid dielectric type comprising an insulating base, a fixed plate secured to and spaced away from said base, a movable plate spaced away, secured to and hinged at one end of said base, said fixed plate having its plane decreasing in its spacing away from said base from a point where said movable plate is hinged and secured to said base, said movable plate having its plane normally increasing in its spacing away from said base after leaving a point where it is hinged and secured thereto, a solid dielectric interposed between said fixed and movable plates, and means for varying the capacity of said condenser comprising a thread in said base and a screw cooperating with said movable plate and the thread in said base.

8. A variable condenser of the solid dielectric type comprising a flat insulating base, a fixed plate secured to and spaced away from said base, a movable plate spaced away, secured to and hinged at one end of said base, said fixed plate having its plane forming a plurality of step-like spaces which decrease in its spacing away from said base after leaving a point where said movable plate is hinged and secured to said base, said movable plate having its plane normally increasing in its spacing away from said base after leaving the point where it is hinged and secured thereto, a solid dielectric interposed between said fixed and movable plates, and means for varying the capacity of said condenser comprising a thread in said base and a screw cooperating with said movable plate and the thread in said base.

9. A variable condenser of the solid dielectric type comprising a flat insulating base, a fixed plate secured to and spaced away from said base, a movable plate spaced away, secured to and hinged at one end of said base, said fixed plate having its plane forming a wedge-shaped space which decreases in its spacing away from said base from a point where said movable plate is hinged and secured to said base, said movable plate having its plane normally increasing in its spacing away from said base after leaving the point where it is hinged and secured thereto, a solid dielectric interposed between said fixed and movable plates, and means comprising a thread in said base and a screw cooperating with said movable plate and the thread in said base for varying the capacity of the condenser.

10. A variable condenser of the solid dielectric type comprising an insulating base, a fixed plate secured to and spaced away from said base, a movable metallic plate spaced away, secured to and hinged at one end of said base, said fixed plate having its plane form a plurality of step-like spaces which decrease in its spacing away from said base after leaving a point where said movable plate is hinged and secured to said base, the movable plate having its plane normally increase in its spacing away from said base after leaving a point where it is hinged and secured thereto, a solid dielectric interposed between said fixed and movable plates, a filling compound interposed between the underside of said fixed plate and said base, and means for varying the capacity of said condenser by movement of said variable plate.

11. In a variable condenser, a first metal electrode, a second metal electrode fixed at one end with respect to said first electrode, a solid dielectric interposed between said first and second electrodes, said solid dielectric increasing in thickness from the fixed end of said second electrode, and means for moving said second electrode throughout the remainder of its unfixed length with respect to the first electrode and dielectric.

12. A variable condenser comprising, a base member, a first metal electrode forming an inclined plane with respect to said base member and secured thereto, a second metal electrode fixedly hinged to said base at one end with respect to the highest point of said first electrode, a solid dielectric interposed between said first and second electrodes, said solid dielectric having one surface parallel to the base member and its other surface parallel to the surface of the first metal electrode, and means for moving said second electrode throughout the remainder of its unfixed length with respect to said first electrode and solid dielectric.

13. A variable condenser comprising, a base member, a first metal electrode secured to said base member, a second spring-like metal electrode fixedly hinged to said base at one end with respect to said first electrode, a solid dielectric interposed between said first and second electrodes, said dielectric increasing in thickness from the fixed end of said second electrode, and means for moving said second electrode throughout the remainder of its unfixed length with respect to said first electrode and solid dielectric.

14. A variable condenser of the solid dielectric type comprising, a base member, a fixed plate secured to and spaced away from said base, a movable plate spaced away, secured to and hinged at one end of said base, said fixed plate having its plane decrease in its spacing away from said base from a point where said movable plate is hinged and secured to said base, said movable plate having its plane normally increasing in its spacing away from said base after leaving the point where it is hinged thereto, a solid dielectric having a cross-section which varies in thickness interposed between said fixed and movable plates, and means for varying the capacity of said condenser by movement of said movable plate.

15. A variable condenser of the solid dielectric type comprising, a base member, a fixed plate secured to and spaced away from said base, a movable plate spaced away, secured to and hinged at one end of said base, said fixed plate having its plane decrease in its spacing away from said base from a point where said movable plate is hinged and secured to said base, said movable plate having its plane normally increasing in its spacing away from said base after leaving the point where it is hinged thereto, a solid dielectric having a cross-section which varies in thickness interposed between said fixed and movable plates, a filling compound interposed between the underside of said fixed plate and said base to insure said fixed plate of retaining its form when said movable plate is moved, and means for varying the capacity of said condenser by movement of said movable plate.

WOLFGANG EGERLAND.